Aug. 15, 1961  W. L. VOEGELI  2,996,126
IMPLEMENT CONNECTION FOR TRACTORS
Filed Aug. 13, 1953  2 Sheets-Sheet 1
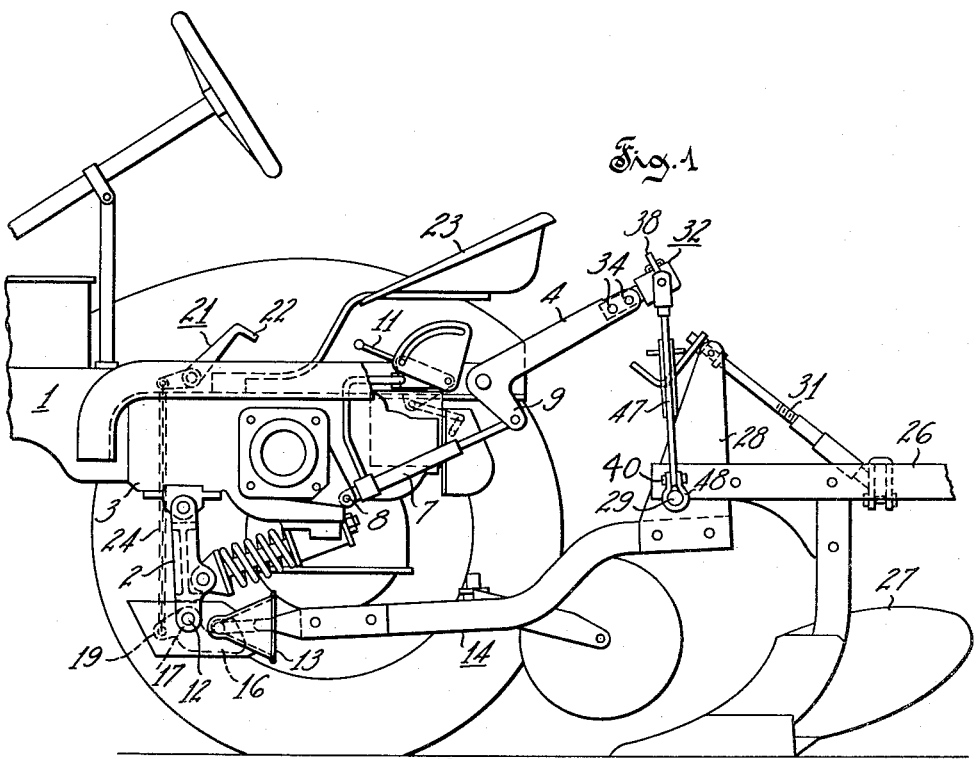
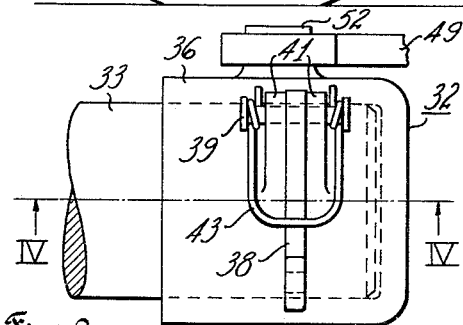
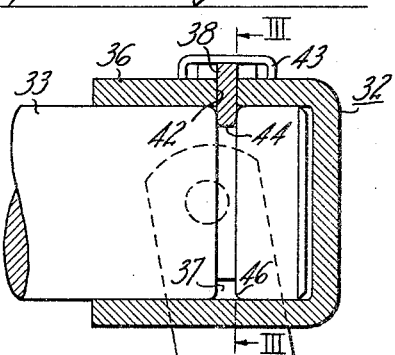
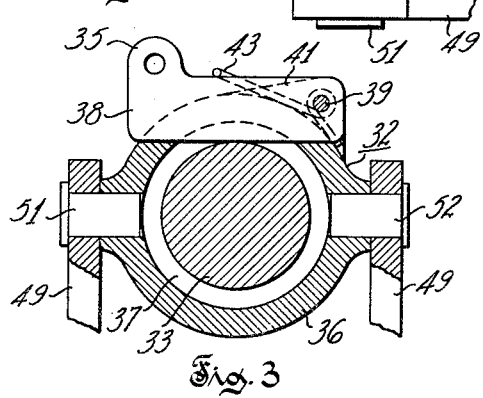
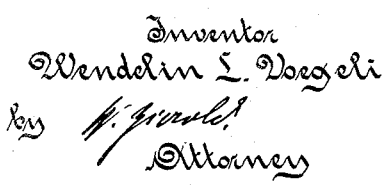

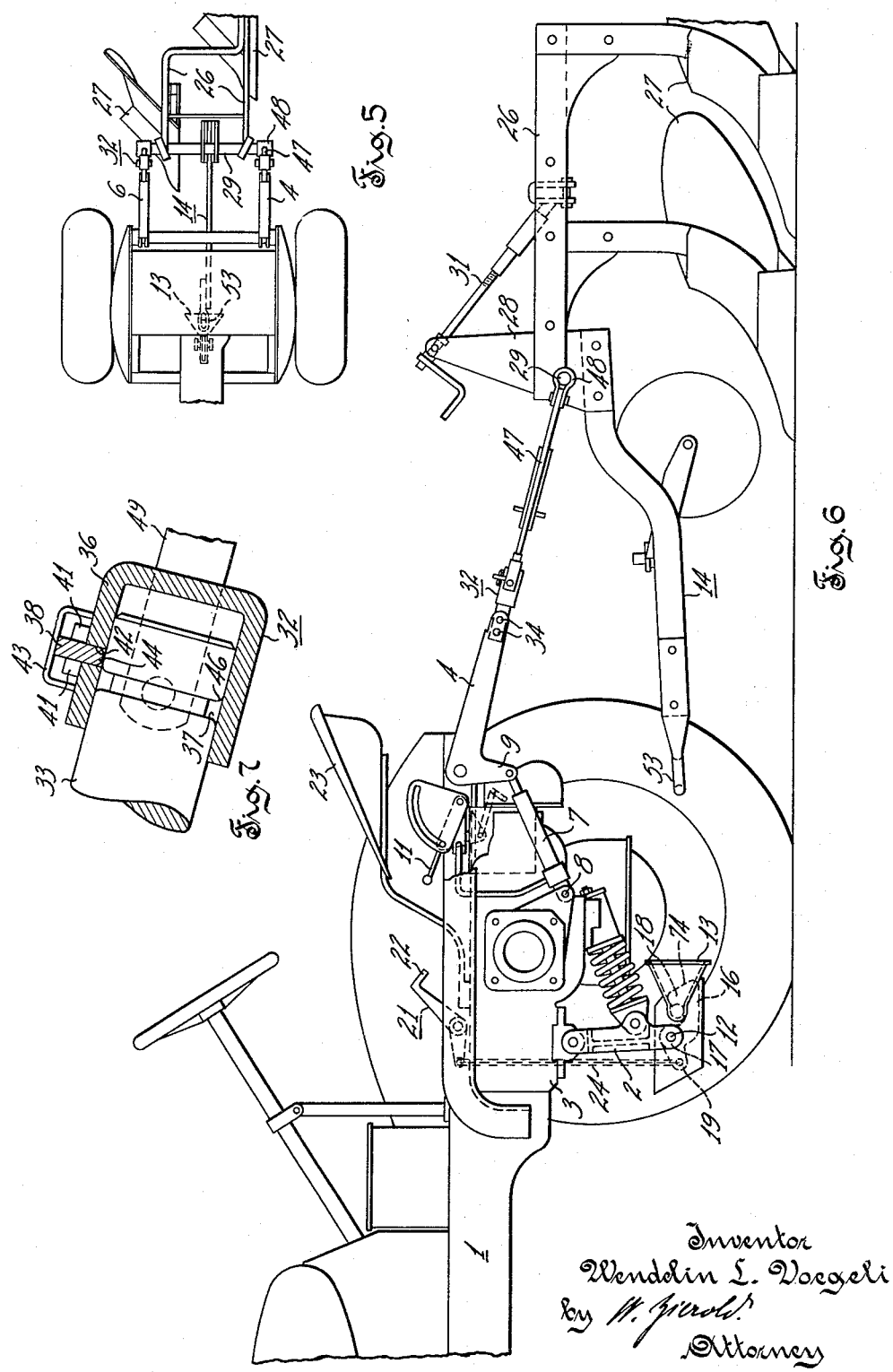

United States Patent Office 2,996,126
Patented Aug. 15, 1961

2,996,126
IMPLEMENT CONNECTION FOR TRACTORS
Wendelin L. Voegeli, West Allis, Wis., assignor to Allis-Chalmers Manufacturing Company, Milwaukee, Wis.
Filed Aug. 13, 1953, Ser. No. 374,053
6 Claims. (Cl. 172—272)

The invention relates to farm machinery and it is concerned more particularly with the hitching of implements, such as plows, harrows, cultivators and the like, to a tractor.

Ordinarily, a farmer who owns a tractor also owns a variety of implements for use with that tractor and it is important that he be able to attach and detach any one of the various implements to the tractor with as little effort and in as short a time as possible. While the problem of quickly hitching an implement to, and unhitching it from, a tractor presents no particular difficulties if the implement is of the trail-behind type which only requires connection of an implement draft pole to the tractor, it is a much more difficult matter to provide a practical quick hitch system for a pickup type implement, that is, for an implement which is connectable with a tractor in such a manner that it can be adjusted up and down relative to the tractor and be supported entirely by the latter in an elevated position for transport purposes. In that case, it becomes necessary to provide not only for the transmission of draft from the tractor to the implement but also for the suspension of the implement on the tractor so that the entire implement can be readily lowered to any desired working position and raised to a suitable transport position. For that purpose, not one but a multiplicity of connections between the tractor and the implement must be provided, and these connections ordinarily do not readily lend themselves for a hitch system which permits change from one implement to another within a relatively short time and with a minimum of effort.

A copending application Serial No. 373,938, filed August 13, 1953, by Willard H. Tanke, now Patent No. 2,834,277, discloses an improved quick hitch system which lends itself for use with pickup implements of the type wherein a forwardly extending hitch tongue has a forward end for connection in draft transmitting relation with a tractor, and wherein a pair of lift links are swingably mounted on the implement at transversely spaced points and rearwardly of the forward end of the hitch tongue. One form of the quick hitch system disclosed in said copending application requires a self-latching, manually releasable coupling mechanism at the underside of the tractor forwardly of the rear ends of a pair of transversely spaced implement lift arms which are operatively mounted on a rearward portion of the tractor in rearwardly extending, up and down swingable relation thereto, and a pair of coupling devices for connecting the lift arms on the tractor in lift load transmitting relation with the lift links of the implement. In that form the system lends itself for use with conventional type coupling devices between the implement lift arms on the tractor and the lift links on the implement. However, if such conventional coupling devices are used the unhitching operation is somewhat encumbered by the necessity of manually separating the lift arms and lift links from each other in order to fully detach the implement from the tractor. Also, accidental release of the hitch tongue from the tractor at the forward coupling mechanism while the tractor is in motion with the implement on the ground, may lead to serious consequences. For instance, the forward end of the released hitch tongue may dig into the ground and continued forward movement of the tractor, and consequent draft on the lift links, may cause the implement to turn over or somersault toward the tractor. Or, the detached implement hitch tongue or some other part of the implement may strike the tractor in some other manner and cause considerable damage. Also, under extreme conditions, the tractor may turn over backward due to the transfer of the point of draft application to the lift arms on the upper part of the tractor.

The principal object of the present invention is to provide an improved quick hitch system of the type outlined hereinbefore with reference to the copending application, but which will reduce the time required for the unhitching operation and also avoid the possible hazards if the draft connection between the hitch tongue and the tractor should be accidentally interrupted while the tractor is in motion with the implement in working position.

Another object of the invention is to provide a mechanism which will accomplish the desired results in a simple and practical manner.

These and other objects and advantages are attained by the present invention, various novel features of which will be apparent from the description herein and the accompanying drawings disclosing an embodiment of the invention, and will be more particularly pointed out in the appended claims.

Referring to the drawings:

FIG. 1 is a side view of the rear end of a tractor and attached pickup plow, the near rear wheel of the tractor being omitted for purposes of disclosure;

FIG. 2 is a top view at an enlarged scale, of a coupling device forming part of the machine shown in FIG. 1;

FIG. 3 is a section on line III—III of FIG. 4;

FIG. 4 is a section on line IV—IV of FIG. 2;

FIG. 5 is a top view, at a reduced scale and somewhat schematic, of the tractor and plow shown in FIG. 1;

FIG. 6 is a view similar to FIG. 1 but showing the tractor and plow in semidetached relation to each other; and FIG. 7 is a sectional view similar to FIG. 4 but showing the coupling device in partially released condition.

Referring to FIG. 1, a conventional wheel type tractor 1 has a hitch yoke 2 depending from its main body 3, and a pair of transversely spaced implement lift arms 4 and 6, see FIG. 5, which are operatively mounted on a rearward portion of the tractor in rearwardly extending, up and down swingable relation thereto. The lift arms 4 and 6 are connected with a conventional hydraulic actuating mechanism including a ram 7 which is mounted on the tractor by a pivot pin 8 and hinged to a lever 9 on the arm 4. The hydraulic actuating mechanism also includes a valve mechanism, not shown, which is controlled by a hand lever 11 so as to either apply lifting power to the arms 4 and 6, or so as to place the arms into free floating condition for up and down movement relative to the tractor. A hydraulic actuating mechanism incorporating a ram such as the ram 7 and a valve mechanism which is controlled by a hand lever such as the lever 11 is fully disclosed, for instance, in U.S. Patent 2,332,629, granted October 26, 1943, to C. E. Frudden for Pump for Power Lifted Implements.

Pivotally mounted on the lower end of the depending hitch yoke 2 by means of a pivot pin 12 is a forwardly tapering bell housing 13 for the reception of the forward end of an implement hitch tongue 14. A latch member 16 has a bearing boss 17 in pivotal engagement with the pivot pin 12 for up and down swinging movement relative to the bell housing 13 and relative to the hitch yoke 2.

Referring to FIG. 6, the latch member 16 also has a hook portion 18 which in the condition of the parts as shown in FIGS. 1 and 6 extends upwardly into the bell housing through a bottom opening of the latter, and an actuating arm 19 is formed on the latch member 16 in forwardly projecting relation to the hook portion 18. A control mechanism for the latch member 16 comprises a bell crank lever 21 which is pivotally mounted on the tractor in elevated relation to the bell housing 13 and has an actuating portion in the form of a foot pedal 22 for actuation by an operator positioned on a driver's seat 23 of the tractor. A chain 24 is connected at its opposite ends with the arm 19 of the latch member 16 and with the bell crank lever 21 so that the operator may swing the latch member 16 downwardly into a released position by stepping on the pedal 22, and when the operator takes his foot off the pedal, the latch will be automatically returned to its locking position by the action of a suitable return spring, not shown, which is connected with the latch member 16.

The pickup plow at the rear of the tractor as shown in FIGS. 1 and 6 is of generally conventional construction and comprises a rigid frame structure 26 on which a pair of plow bottoms 27 are rigidly mounted in conventional manner. An upright support 28 is mounted on the plow frame 26 for pivotal movement relative thereto about a transverse pivot member 29. A screw type adjusting mechanism 31 is operatively interposed between the plow frame 26 and the support 28 for effecting beaming adjustment of the plow, and the hitch tongue 14 is rigidly secured at its rear end to the lower end of the support 28.

As shown in FIG. 1, the implement lift arm 4 at the left side of the tractor mounts an automatically releasable coupling device which is designated in its entirety by the reference character 32 and which is shown in detail in FIGS. 2, 3 and 4. Referring to the detail figures, the coupling device comprises an implement lift load transmitting element in the form of a journal stud 33 which is rigidly secured to the lift arm 4 by means of bolts 34, and which has a cylindrical end portion projecting rearwardly from the lift arm 4. Pivotally mounted on the cylindrical end portion of the journal stud 33 for axial sliding movement relative thereto is a coupling sleeve 36 which has a cylindrical inner surface in radial load transmitting engagement with the cylindrical outer surface of the stud journal 33. The rear end of the coupling sleeve 36 is closed by an end wall which is abuttable with the end face of the stud journal 33 to limit axial forward movement of the coupling sleeve 36 relative to the lift arm 4.

As best shown in FIGS. 3 and 4, an annular groove 37 is formed in the cylindrical portion of the stud journal 33 at a short distance forwardly of the rear end of the latter. The groove 37 serves as a recess into which a latch member 38 may be dropped to releasably secure the coupling sleeve 36 against axial back and forth movement on the stud journal 33. As shown in FIGS. 2 and 3, the latch member 38 is generally rectangular and extends transversely of the coupling sleeve 36. A hinge pin 39 extends through a hole at one end of the latch 38 and through aligned holes in a pair of mounting lugs 41 which are integrally formed with the coupling sleeve 36 and extend upwardly therefrom in straddling relation to the latch member 38. The sleeve 36 has a transverse slot 42, FIG. 7, in its upper part which accommodates pivotal movement of the latch 38 about its pivot pin into and out of the circular groove on the stud journal 33. A lug 35 at the end of the latch member 38 remote from the hinge pin 39 permits manual actuation of the latch when desired. A hair pin spring 43 is coiled about the hinge pin 39 at the outer sides of the mounting lugs 41 and has free end portions bearing on the outer side of the coupling sleeve 36. The spring 43 straddles the latch 38 and is suitably tensioned to exert a downward load at its apex upon the latch member 38 at a suitable distance from the hinge pin 39 so that in the assembled condition of the parts as shown in FIG. 3, the latch member 38 will be resiliently urged with moderate pressure into the annular groove 37 of the stud journal 33 as best shown in FIGS. 4 and 3. The latch member 38 has a rounded bottom edge 44 and the circular rear edge 46 of the groove 37 at the periphery of the stud journal 33 is likewise rounded, the purpose being to provide for automatic release of the latch member 38 from the groove 37 by a camming action of the rounded edge 46 against the rounded edge 44 when the coupling sleeve 36 becomes subjected to a substantial pull in the direction of its axis as will be explained more fully hereinbelow with reference to FIG. 6.

As shown in FIG. 1, an implement lift link 47 is operatively interposed between the coupling sleeve 36 on the lift arm 4 and the left end of the pivot member 29 on the plow frame 26. The lower end of the link 47 is connected with the pivot member 29 by a universal joint coupling 48 of conventional construction and includes a bolt 40 extending through joint coupling 48 and the lower end of lift link 47 to provide a pivot connection having an axis transverse to the axis of pivot member 29, and a forked rod end 49 is secured to the upper end of the lift link 47 in straddling relation to the coupling sleeve 36. Diametrically opposite trunnions 51 and 52 are secured to the sleeve member 36 and extended through aligned holes in the prongs of the rod end 49, as best shown in FIG. 3, to secure the sleeve 36 and the lift link 47 in pivotally connected relation to each other. The other lift arm 6 on the tractor is connected with the right end of the pivot member 29 on the plow frame in the same manner as explained hereinbefore with reference to the lift link 47.

In the condition of the machine as shown in FIG. 1, the plow rests on the ground and the control lever 11 for the hydraulic system is adjusted to a position which places the implement lift arms 4 and 6 in a free floating condition for up and down movement relative to the tractor. Upon upward adjustment of the control lever 11 from the position in which it is shown in FIGS. 1 and 6, the hydraulic system becomes effective to apply lifting power to the arms 4 and 6 and, as a result, the plow will be raised about the contact point of the forward end of the hitch tongue 14 with the bell housing 13. As shown in FIG. 5, the forward end of the tongue 14 has an oblong loop 53 which is engaged in forward draft transmitting, universally swingable relation with the hook portion 18 of the latch member 16. In order to separate the tractor from the plow, the operator moves the control lever 11 from its raised position, not shown, to the position in which it is shown in FIGS. 1 and 6 so that the plow will come to rest on the ground and the coupling devices 32 will carry no implement load and only the light downward load which may result from the tendency of the lift arms 4 and 6 to lower under their own weight.

With the engine running and the plow on the ground, the operator may step on the foot pedal 22 to release the latch member 16 from engagement with the loop 53 of the hitch tongue 14. If such release is effected while the tractor is at standstill, actual separation of the tractor from the plow will take place when the tractor is started to move forward, as by letting in the master clutch, while the foot pedal 22 is kept down. On the other hand, if the mentioned release of the latch member 16 from the loop 53 is effected while the tractor and plow are moving forward as a unit, depression of the foot pedal 22 will immediately halt forward movement of the plow while forward movement of the tractor continues. In either case the bell housing 13 will move with the tractor away from the loop 53 of the hitch tongue, and the lift links 47 will initially remain connected with the lift arms 4 and 6. However, during the forward movement of the tractor relative to the plow, the lift arms 4 and 6 will gradually move downward and the lift links 47 will gradually move forward until a condition of alignment between the lift arms and lift links is attained which is illustrated by FIG. 6. With the control lever 11 adjusted to its downward position, the lift arms 4 and 6 are in a free floating condition for up and down movement relative to the tractor, and no appreciable draft force will therefore be transmitted from the tractor to the plow until the aligned condition of the lift arms and lift links as shown in FIG. 6 has been attained. Forward movement of the tractor will be continued after the aligned condition between the lift arms and lift links has been attained and, as a result, pull will be transmitted from the stud journals 33 to the latch members 38 and from the latter through the coupling sleeves 36 and lift links 47 to the plow. The curvatures 44 and 46 on the latch member 38 and stud journal 33, respectively, are so proportioned and the tension of the hairpin spring 43 is so selected that the latch 38 will be cammed out of draft transmitting engagement with the groove 37 when the forward pull of the tractor upon the plow reaches a predetermined, relatively moderate magnitude. Disengagement of the latch 38 in the described manner releases the coupling sleeves 36 for rearward sliding movement on the studs 33, as illustrated by FIG. 7, and continued forward movement of the tractor will pull the stud journals 33 entirely out of the coupling sleeves 36. In this manner, the tractor will be automatically disengaged from the lift links 47 and the latter will drop to the ground or be caught by any suitable chains, not shown, which may be connected to the lift links and to the upright support 28.

In order to reattach the plow to the tractor, the operator backs the tractor toward the plow so as to engage the bell housing 13 with the loop 53 of the hitch tongue 14. Due to the large rear opening of the bell housing, it is not necessary for the operator to maneuver the tractor exactly in the longitudinal direction of the draft tongue 14, but he may come in at an angle or even on a somewhat laterally offset course. After the loop 53 has entered the bell housing 13, continued backward movement of the tractor will move a rearward slanting surface 74, FIG. 6, of the latch member 16 into engagement with the round forward surface of the loop 53 and, as a result, the latch member 16 will be cammed downward so that the loop 53 may fully enter the bell housing until it hits the inside concave apex surface at the forward end of the latter. In that condition, the latch 16 will swing upward to the position in which it is shown in FIG. 1, thereby automatically establishing a universally swingable, forward draft transmitting connection between the tractor and the plow.

A pair of power lift arms, such as the arms 4 and 6, and a hydraulic actuating mechanism which may be operated selectively to either swing the arms upwardly by power or to place them into a free floating condition in which they may be swung back and forth manually or otherwise from one limit position to another without appreciable resistance are well known in the art and are commonly incorporated in farm tractors. Likewise, it is a common practice to provide various types of implements, such as plows, harrows, field cultivators, listers and the like with a pair of lift chains or with a pair of lift links which are connected at their lower ends, like the lift links 47, with the implement for universal swinging movement relative to the latter. If a farmer owns one of the mentioned tractors and several implements which may be used with that tractor and which are each equipped with a pair of lift chains or links as stated, he may provide the tractor with a self-latching manually releasable coupling device such as the bell housing 13 and the latch hook 16. Additionally, each of the several implements may be equipped with a hitch loop such as the loop 53, and with a pair of lift force transmitting coupling devices such as the coupling devices 32. The installation of the mentioned draft transmitting and lift force transmitting coupling devices will enable the farmer to get the tractor ready for work with any one of the different implements quickly and conveniently, and without tools.

For instance, if the tractor has been used with a plow as shown in FIG. 1 or as shown in FIG. 6, and it is desired to use the tractor with any of the other implements (not shown), a farmer may drop the plow wherever he wants to put it, usually some place in the barnyard, drive the tractor away from the plow and back it up toward the desired other implement which may be standing somewhere else.

The barnyard or other place where the change of implements is to be made will ordinarily be natural ground, that is, it will neither be level nor even, and it may have vegetation so that it would be difficult to align the tractor and the implement with any degree of accuracy before they are connected together. The herein disclosed power lift system takes care of this difficulty in that it is operable to first establish a universally swingable draft transmitting connection between the tractor and the implement, and then to establish two lift force transmitting connections, one after the other, between the tractor and the implement at opposite sides, respectively, of the latter so that lifting power may be applied to one side of the implement through one of said lift force transmitting connections for tilting the implement laterally relative to the tractor preparatory to the establishment of the other of said lift force transmitting connections.

Assuming, for instance, that due to ground irregularities an implement having a pair of equally long lift links is in a laterally tilted condition relative to the tractor after the coupling loop 53 has been engaged by the latch hook 16, the two lift force transmitting connections between the tractor and the implement may then be established as follows without changing the length of either lift link. An operator on the tractor seat, by leaning backward, may take hold of the coupling sleeve 36 on the lift link 47 at the low side of the implement and engage it with the journal stud 33 of the adjacent tractor power lift arm. For the performance of this part of the connecting operation the power lift arms are preferably placed in the free floating condition which has been mentioned hereinbefore. Next, the operator may apply lifting power to the connected lift link at the low side of the implement by manipulation of the hand lever 11 and continue such application of lifting power until the lower ends of both lift links 47 are on a level approximately parallel to the pivot axis of the power lift arms 4 and 6 on the tractor. It will then be an easy matter to connect the other coupling sleeve 36 with the journal stud 33 of the other power lift arm. In a similar manner a pair of lift force transmitting connections may be established between a tractor and a plow on which the lift link at one side is longer than the lift link at the other side for winging purposes.

If the hitch tongue 53 should accidentally become detached from the latch hook 18 while the tractor is in motion with the plow in the ground, the detached forward end of the tongue may drop to the ground, but the plow could not somersault toward the tractor because the coupling devices 32 would become separated before the pull on the lift links 47 could rise to a dangerous magnitude.

In general terms, the herein disclosed hitch and power lift system comprises a coupling device having relatively engageable and disengageable component elements, as represented by the latch member 16 and loop 53, which are operatively connected, respectively, with the tractor and implement and are operable to automatically establish a universal draft transmitting connection between the tractor and implement by relative movement of the tractor and implement in a mutually approaching direction. Control means, as represented by the lever 21 and associated chain 24, are mounted on the tractor and manually operable to interrupt said draft transmitting connection at the will of the operator.

A pair of lift force transmitting or implement suspension elements, as represented by the lift links 47, are universally connected in lift and draft force transmitting relation with the implement rearwardly of the coupling device 16, 53, and a pair of lift force transmitting articulated coupling devices which in the illustrated embodiment of the invention include the coupling sleeves 36 and associated forked rod ends 49, are operatively associated independently of each other with the suspension elements 47.

The hydraulic actuating mechanism including the ram 7 and hand lever 11 represents actuating means for the power lift arms which are selectively operable to either swing the latter upwardly about their pivot axis into an implement raised position, as by upward movement beyond the position shown in FIG. 1, or to release the power lift arms for downward swinging movement about their pivot axis to an extent which, as shown in FIG. 6, will enable said lift force transmitting elements to swing into radial relation to the pivot axis of the power lift arms upon interruption of the forward draft transmitting connection at the coupling device 16, 53, and subsequent advance movement of the tractor relative to the implement.

The stud journals 33 and the portions of the coupling sleeves 36 which are telescoped over the journals 33, broadly considered, represent releasable connecting means which operatively mount the lift force transmitting coupling devices 36, 49, respectively, on the power lift arms 4 and 6 for swinging movement therewith about the transverse pivot axis of the latter and for separation therefrom in a rearward direction. The releasable connecting means 33, 36 are constructed, mounted and arranged so that lifting force transmitted thereto from the power lift arms 4 and 6, respectively, will be ineffective to separate the coupling devices 36, 49 from the power lift arms 4 and 6 while the universal draft transmitting connection at the coupling device 16, 53 is established, as illustrated by FIG. 1, and so that pull transmitted to the connecting means 33, 36 from the power lift arms upon interruption of the draft transmitting connection and subsequent advance movement of the tractor relative to the implement will be effective to separate the coupling device 36, 49 from the power lift arms.

More specifically, the stud journals 33 represent support means on the power lift arms presenting bearing portions, respectively, cooperable with complementary bearing portions of the lift force transmitting coupling devices 36, 49 so as to mount the latter on said power lift arms for swinging movement therewith and for separation therefrom radially of the transverse pivot axis of the power lift arms 4 and 6. The spring biased latches 38 are operatively interposed between the coupling devices 36, 49, respectively, and the support means 33 for yieldingly resisting separation of the coupling devices 36, 49 from their associated power lift arms.

The latch means afforded by the latches 38 and associated elements are constructed, mounted and arranged so as to transmit pull of predetermined magnitude from the power lift arms 4 and 6 to the suspension elements 47 upon interruption of the universal draft transmitting connection at 16, 53 and subsequent advance movement of the tractor relative to the implement, and so as to yield to said pull when it exceeds said predetermined magnitude, so that the power lift arms 4 and 6 will be automatically separated from the lift force transmitting coupling devices 36, 49 upon said advance movement of the tractor relative to the implement.

As shown in FIGS. 2, 3 and 4, the trunnions 51 and 52 and the associated forked rod end 49 cooperate to secure the lift force transmitting element 47 at its upper end to the associated coupling or hanger sleeve 36 for swinging movement on an axis in right angle relation to the axis of the hanger sleeve, and upon interruption of the draft transmitting connection between the tractor and implement at the coupling device 16, 53, and subsequent advance movement of the tractor, the lift force transmitting elements 47 swing into radial relation to the pivot axis of the power lift arms 4 and 6, and into axial alignment with the sleeves 36 as shown in FIG. 6.

It should be understood that it is not intended to limit the invention to the hereinabove described forms and details, and that the invention includes such other forms and modifications as are embraced by the scope of the appended claims.

It is claimed and desired to secure by Letters Patent:

1. A hitch and power lift system for connecting an implement with a tractor by first establishing a universally swingable draft transmitting connection between said tractor and implement and then establishing two lift force transmitting connections, one after the other, between said tractor and said implement at opposite sides, respectively, of the latter, so that lifting power may be applied to one side of said implement through one of said lift force transmitting connections for tilting said implement laterally relative to said tractor preparatory to the establishment of the other of said lift force transmitting connections; said system comprising, in combination, a coupling device having relatively engageable and disengageable component elements operatively connected, respectively, with said tractor and implement and being operable to automatically establish a universal draft transmitting connection between said tractor and implement by relative movement of said tractor and implement in a mutually approaching direction, control means for said coupling device mounted on said tractor and manually operable to interrupt said draft transmitting connection; a pair of power lift arms mounted on said tractor for up and down swinging movement relative thereto about a transverse axis and each having an end stud in generally radially extending relation to said transverse axis; a pair of hanger sleeves associated, respectively, with said end studs in rotatable, radially supported and axially withdrawable relation thereto; yieldable latch means operatively interposed between each of said end studs and its associated hanger sleeve so as to releasably secure said hanger sleeves against axial separation from their respective end studs; a pair of lift force transmitting elements universally connected at their lower ends with said implement in transversely spaced relation to each other; pivot means associated with said hanger sleeves, respectively, and operatively connected with said lift force transmitting elements so as to secure the latter at their upper ends to said hanger sleeves for swinging movement on axes in right angle relation to the axes of said hanger sleeves; and actuating means for said power lift arms selectively operable to either swing the latter upwardly into an implement raised position in which said lift force transmitting elements extend transversely of and in radially spaced relation to said transverse axis, or to release said lift arms for swinging movement about said transverse axis in a downward direction to an extent which will enable said lift force transmitting elements to swing on said hanger sleeves into axial alignment with the latter upon interruption of said draft transmitting connection and subsequent advance movement of said tractor relative to said implement.

2. A hitch and power lift system as set forth in claim 1, wherein each of said end studs has a circumferential groove, and wherein said yieldable latch means comprise a pair of latch elements pivoted, respectively, on said hanger sleeves for movement into and out of cooperative engagement with said grooves, and spring means biasing said latch elements, respectively, into cooperative engagement with said grooves.

3. A hitch and power lift system as set forth in claim 2, wherein said latch elements and grooves have rounded edge portions, respectively, in camming engagement with each other so as to automatically move said latch elements out of cooperative engagement with said end studs upon transmission of draft in excess of a predetermined limit from said end studs to said hanger sleeves.

4. A hitch and power lift system for connecting an implement with a tractor, said system comprising, in combination, a coupling device having relatively engageable and disengageable component elements operatively connected, respectively, with said tractor and implement and being operable to automatically establish a universal draft transmitting connection by relative movement of said tractor and implement in a mutually approaching direction, control means for said coupling device mounted on said tractor and manually operable from an operator's station to interrupt said draft transmitting connection; a pair of power lift arms rotatably mounted on said tractor for unitary swinging movement on a transverse axis; a pair of suspension elements universally connected with said implement at one side and at the other side, respectively, thereof; a pair of lift force transmitting articulated coupling devices operatively associated independently of each other with said suspension elements, respectively; releasable connecting means operatively mounting said lift force transmitting coupling devices, respectively, on said power lift arms for swinging movement therewith about said transverse axis and for separation therefrom in a rearward direction; and actuating means for said power lift arms selectively operable to cause swinging movement of the latter about said axis upwardly into or downwardly from an implement raised position; said releasable connecting means being constructed, mounted and arranged so that lifting power transmitted thereto from said power lift arms will be ineffective to separate said coupling devices from said power lift arms while said draft transmitting connection is established, and so that pull transmitted to said connecting means from said power lift arms upon interruption of said draft transmitting connection and subsequent advance movement of said tractor relative to said implement will be effective to separate said coupling devices from said power lift arms.

5. A hitch and power lift system for connecting an implement with a tractor, said system comprising, in combination, a coupling device having relatively engageable and disengageable component elements operatively connected, respectively, with said tractor and implement and being operable to automatically establish a universal draft transmitting connection between said tractor and implement by relative movement of said tractor and implement in a mutually approaching direction, control means for said coupling device mounted on said tractor and manually operable from an operator's station to interrupt said draft transmitting connection; a pair of power lift arms rotatably mounted on said tractor for unitary swinging movement on a transverse axis; a pair of suspension elements universally connected with said implement at one side and at the other side, respectively, thereof; a pair of lift force transmitting articulated coupling devices operatively associated independently of each other with said suspension elements, respectively; support means on said power lift arms cooperable with said lift force transmitting coupling devices, respectively, so as to mount the latter on said power lift arms for swinging movement therewith about said transverse axis and for separation therefrom in a rearward direction; latch means operatively interposed between said coupling devices, respectively, and said support means for yieldingly resisting said separation; and actuating means for said power lift arms selectively operable to cause swinging movement of the latter about said axis upwardly into or downwardly from an implement raised position; said latch means being constructed, mounted and arranged so as to transmit a pull of predetermined magnitude from said power lift arms to said suspension elements upon interruption of said draft transmitting connection and subsequent advance movement of said tractor relative to said implement, and so as to yield to said pull when it exceeds said predetermined magnitude, so that said power lift arms will be automatically separated from said lift force transmitting coupling devices upon said advance movement of said tractor relative to said implement.

6. A hitch and power lift system for connecting an implement with a tractor, said system comprising, in combination, a coupling device having relatively engageable and disengageable component elements operatively connected, respectively, with said tractor and implement and being operable to automatically establish a universal draft transmitting connection between said tractor and implement by relative movement of said tractor and implement in a mutually approaching direction, control means for said coupling device mounted on said tractor and manually operable from an operator's station to interrupt said draft transmitting connection; a pair of power lift arms rotatably mounted on said tractor for unitary swinging movement on a transverse axis; a pair of suspension elements universally connected with said implement at one side and at the other side, respectively, thereof; a pair of lift force transmitting articulated coupling devices operatively associated independently of each other with said suspension elements, respectively; support means on said power lift arms presenting bearing portions, respectively, cooperable with complementary bearing portions of said lift force transmitting coupling devices so as to mount the latter on said power lift arms for swinging movement therewith about said transverse axis and for separation therefrom in a direction radially away from said axis; actuating means for said power lift arms selectively operable to either swing the latter upwardly about said axis into an implement raised position, or to release said lift arms for downward swinging movement about said axis to an extent which will enable said suspension elements to swing into radial relation to said axis upon interruption of said draft transmitting connection and subsequent advance movement of said tractor relative to said implement; and yieldable latch means operatively interposed between said coupling devices, respectively, and said support means; said support means, latch means and coupling devices being operative when said suspension elements are positioned in said radial relation to said axis of said power lift arms to transmit pull to said suspension element upon said advance movement of said tractor, and said latch means being effective to release said coupling devices from said support means when said pull exceeds a predetermined magnitude.

References Cited in the file of this patent

UNITED STATES PATENTS

| | | |
|---|---|---|
| 1,744,612 | Conner | Jan. 21, 1930 |
| 1,982,008 | Mandl | Nov. 27, 1934 |
| 2,036,953 | Morris | Apr. 7, 1936 |
| 2,184,422 | Graham | Dec. 26, 1939 |
| 2,332,629 | Frudden | Oct. 26, 1943 |
| 2,381,258 | Cantral | Aug. 7, 1945 |
| 2,383,689 | Silver | Aug. 28, 1945 |
| 2,420,530 | Evans | May 13, 1947 |
| 2,478,591 | Miller | Aug. 9, 1949 |
| 2,505,609 | Ego | Apr. 25, 1950 |
| 2,562,817 | Pethick | July 31, 1951 |
| 2,602,389 | Markel | July 8, 1952 |
| 2,834,277 | Tanke | May 13, 1958 |

FOREIGN PATENTS

| | | |
|---|---|---|
| 462,491 | Canada | Jan. 17, 1950 |
| 828,167 | Germany | Jan. 17, 1952 |